United States Patent

Takano et al.

[11] Patent Number: 5,171,294
[45] Date of Patent: * Dec. 15, 1992

[54] TORQUE DISTRIBUTION CONTROL SYSTEM FOR A FOUR-WHEEL DRIVE MOTOR VEHICLE

[75] Inventors: Toshio Takano; Toshio Kobayashi, both of Tokyo, Japan

[73] Assignee: Fuji Jukogyo Kabushiki Kaisha, Tokyo, Japan

[*] Notice: The portion of the term of this patent subsequent to Nov. 19, 2008 has been disclaimed.

[21] Appl. No.: 772,629

[22] Filed: Oct. 7, 1991

Related U.S. Application Data

[63] Continuation of Ser. No. 485,094, Feb. 23, 1990, abandoned.

[30] Foreign Application Priority Data

Feb. 28, 1989 [JP] Japan ................................. 1-048149
Jun. 30, 1989 [JP] Japan ................................. 1-170896

[51] Int. Cl.⁵ ............................................. F16H 1/42
[52] U.S. Cl. ..................................... 475/249; 180/248; 180/249
[58] Field of Search ................................ 180/248, 249; 192/103 F; 475/84, 86, 87, 89, 91, 118, 121-123, 125, 225, 248, 249, 257

[56] References Cited

U.S. PATENT DOCUMENTS

| | | | |
|---|---|---|---|
| 4,466,502 | 8/1984 | Sakai | 180/248 |
| 4,481,877 | 11/1984 | Takano et al. | 192/0.032 X |
| 4,691,593 | 9/1987 | Mueller | 180/249 X |
| 4,779,487 | 10/1988 | Pitsch et al. | 180/249 X |
| 4,882,950 | 11/1989 | Gausrab et al. | 180/248 X |
| 4,884,650 | 12/1989 | Fujiki et al. | 180/248 X |
| 5,066,268 | 11/1991 | Kobayashi | 475/249 |

FOREIGN PATENT DOCUMENTS

62-50233  3/1987  Japan ................................. 180/248
63-176728 7/1988  Japan .

Primary Examiner—Leslie A. Braun
Assistant Examiner—Benjamin Levi
Attorney, Agent, or Firm—Martin A. Farber

[57] ABSTRACT

A system for controlling torque distributed to front wheels and rear wheels of a motor vehicle comprises a planetary gear device including a first sun gear connected to an output shaft of a transmission, a carrier, first and second planetary pinions coupled with each other and rotatably supported on the carrier, and a second sun gear disposed between a front torque transmitting member and a rear torque transmitting member. The first planetary pinion is engaged with the first sun gear, and the second planetary pinion is engaged with the second sun gear. A fluid operated multiple-disk clutch is disposed between the carrier and the rear torque transmitting member so as to restrict the differential operation of the planetary gear device.

1 Claim, 8 Drawing Sheets

TORQUE DISTRIBUTION CONTROL SYSTEM FOR A FOUR-WHEEL DRIVE MOTOR VEHICLE

RELATED APPLICATION

This application is a continuation of our co-pending application Ser. No. 07/485,094 filed Feb. 23, 1990, now abandoned.

BACKGROUND OF THE INVENTION

The present invention relates to a torque distribution control system for a four-wheel drive motor vehicle having a central differential.

In a four-wheel drive motor vehicle, a conventional torque distribution ratio of front wheels and rear wheels is determined in accordance with a dynamic load ratio of the front and rear wheels, considering the movement of the center of gravity of the vehicle at acceleration so that the power of the engine may be most effectively used.

In the four-wheel drive vehicle based on mainly front-drive with a front-mounted engine, the ratio of front torque $T_F$ to the front wheels and rear torque $T_R$ to the rear wheels are in the ratio of 50:50. In the four-wheel drive vehicle based on mainly rear-drive with a front-mounted engine, the front torque $T_F$ and the rear torque $T_R$ are in the ratio of 40:60. A central differential comprising bevel gears is provided in the former system in which the output torque of the engine is equally distributes, and a central differential having a simple planetary gear device is provided in the latter system.

The former system ensures safe driving on a slippery road. If a differential lock device is provided for locking the central differential, the driveability of the vehicle is improved. However, when the vehicle a turn at high speed under the differential lock all of four wheels may slip (i.e. the vehicle at the same time, causing difficult driving.

In order to ensure a driving stability of the vehicle, the torque to the rear wheels is set to a larger than that to the front wheels by arranging the differential comprising the simple planetary gear device, so that first the rear wheels may slip. Thus, the vehicle can be safely driven by the front wheels at a small torque while the rear wheels do not drive.

Japanese Patent Application Laid-Open 63-176728 discloses a four-wheel drive motor vehicle in which a central differential comprising a simple planetary gear device is provided. The output of a transmission is transmitted to a carrier of the planetary gear device. The torque is distributed to front wheels through either a sun gear or a ring gear and to rear wheels through the other gear. The torque to front and rear wheels is unequally distributed at the ratio determined by the difference between the pitch circles of the sun gear and the ring gear. A fluid operated multiple-disk friction clutch as a lock device is provided for controlling the differential operation. A wide range of torque distribution ratio determined by the ratio of the pitch circle can not be attained because the diameters of the sun gear and the ring gear are limited. However, it is difficult to change the diameters because of limitation of space.

Further, in a power transmitting system where an output shaft of a transmission is inserted in the sun gear of the planetary gear device, the diameter of the sun gear becomes large, which renders the size of a transfer device large and hence the space in the vehicle is reduced. Since the distribution of torque to the rear wheels can not be set to a large value, the control range of the multiple-disk friction clutch becomes small. Consequently, a motor vehicle having good driveability and, controllability can not be provided.

SUMMARY OF THE INVENTION

An object of the present invention is to provide a torque distribution control system for a for-wheel drive motor vehicle in which the standard torque ratio of the front wheels and rear wheels can be easily changed.

Another object of the present invention is to provide a system which can be applied to any kinds of motor vehicles having various layouts of the power transmission system.

A further object of the invention is to provide a system in which a large torque is distributed to the rear wheels, thereby enabling the control of a wide torque distribution range with a fluid operated friction clutch.

According to the present invention, there is provided a system for controlling torque distribution to front wheels and rear wheels of a motor vehicle having a transmission having an output shaft comprising a planet gear device including a first sun gear connected to the output shaft of the transmission, a carrier, first and second planetary pinions integral with each other and rotatably supported on the carrier, and a second sun gear, the first planetary pinion being engaged with the first sun gear, and the second planetary pinion being engaged with the second sun gear, a front torque transmitting member operatively connected to the carrier and to the front wheels, a rear torque transmitting member operatively connected to the second sun gear, a fluid operated multiple-disk clutch disposed between the second sun gear and the carrier, so as to restrict the differential operation of the planetary gear device, and control means for controlling the clutch torque of the multiple-disk clutch in accordance with driving conditions of the vehicle.

The other objects and features of this invention will become understood from the following description with reference to the accompanying drawings.

DETAILED DESCRIPTION OF THE PREFERRED EMBODIMENTS

Figure 1:
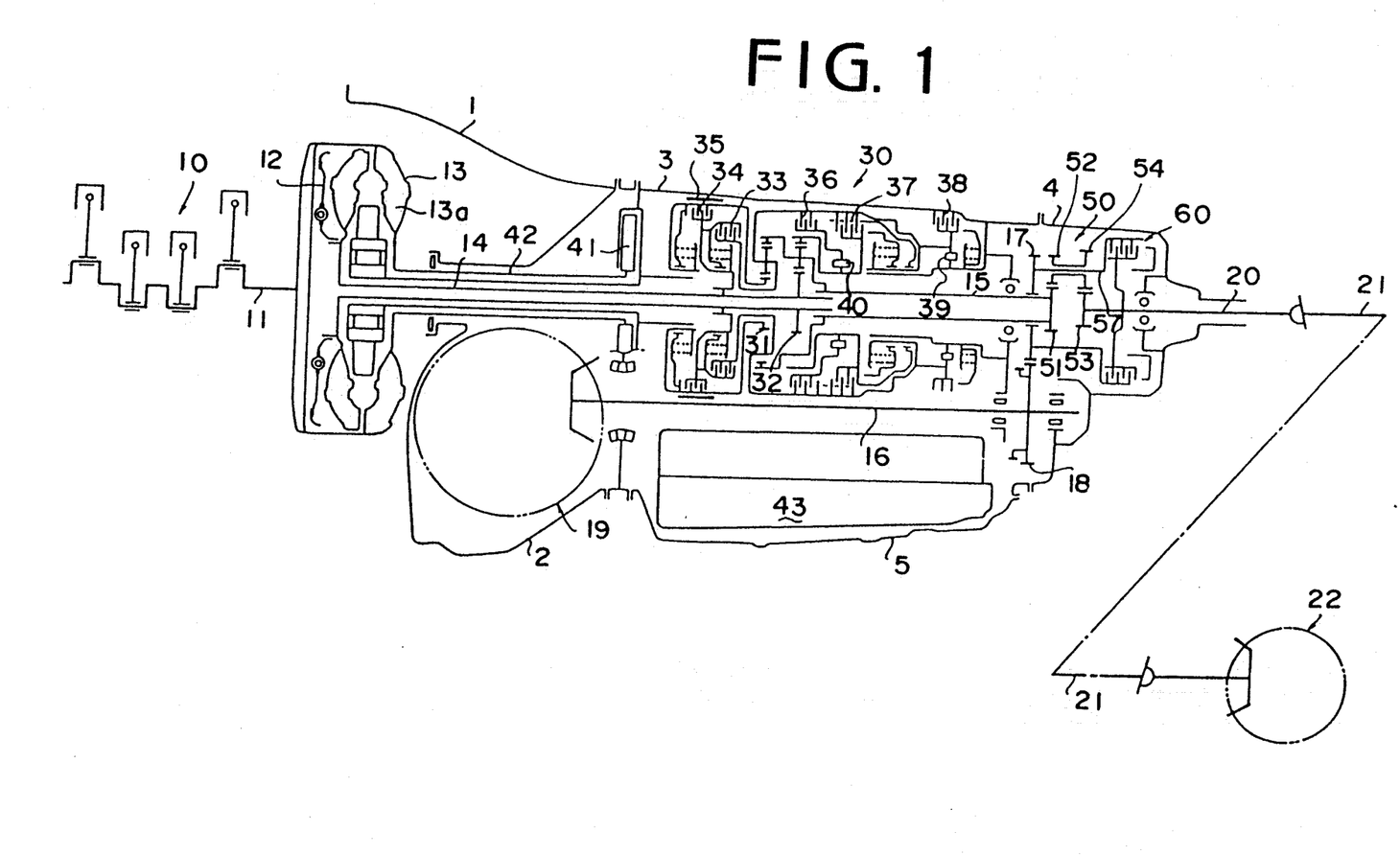
FIG. 1 is a schematic diagram showing power transmission system for a four-wheel drive vehicle according to the present invention.

FIG. 1 shows a power transmission system in a transaxle type for a four-wheel drive motor vehicle having an engine 10 at a front portion thereof. The power transmission system has a torque converter 13 with a lockup clutch 12 mounted in a converter box 1, and a front differential 19 mounted in a differential box 2 behind the torque converter 13. A transmission case 3 housing an automatic transmission 30 is attached to the rear of the differential box 2. An oil pan 5 is attached under the transmission case 3. A crankshaft 11 of the engine 10 is operatively connected with the torque converter 13. An input shaft 1 extends from a turbine of the torque converter 13 to the automatic transmission 30. The output of the automatic transmission 30 is transmitted to an output shaft 15 which is aligned with the input shaft 14 for transmitting the torque rearwardly. The output shaft 15 is connected a front drive shaft 16 which is disposed in parallel under the automatic transmission 30 through a pair of reduction gears 17 and 18 of a central differential 50 housed in a transfer case 4. The front drive shaft 16 is connected to front wheels of the vehicle through a front differential 19. The output shaft 15 is connected to a rear drive shaft 20 through the central differential 50. The rear drive shaft 20 is connected to rear wheels of the vehicle through a propeller shaft 21 and a rear differential 22. A fluid operated multiple disk friction clutch 60 is provided in the central differential 50. The automatic transmission 30 comprises two sets of single planetary gears consisting of a front planetary gear 31 and a rear planetary gear 32 for providing four forward speeds and one reverse speed. The automat transmission has a high clutch 33, a reverse clutch 34, a brake band 35, a forward clutch 36, an overrunning clutch 37, a low and reverse clutch 38, and one-way clutches 39 and 40.

An oil pump 41 is provided in the front end of the transmission case 3. A pump drive shaft 4 is connected to an impeller 13a of the torque converter 13 and is operatively connected with a rotor of the oil pump 41.

In the oil pan 5, a control valve body 43 is provided for hydraulically actuating the respective clutches and brake of the transmission 30.

Figure 2A:
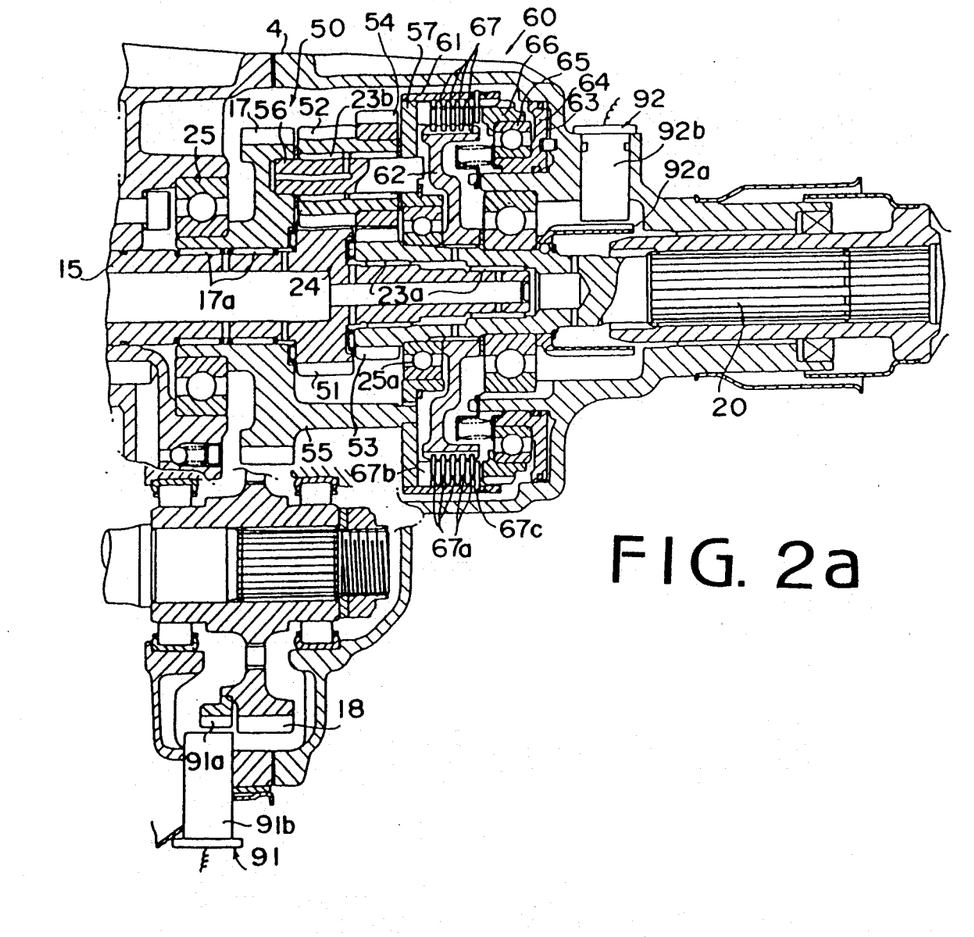
FIG. 2a is an enlarged sectional view showing a central differential of the system.

Referring to FIG. 2a showing the central differential 50, an end of the rear drive shaft 20 is rotatably mounted on the output shaft 15 through a pair of needle bearings 23a and a thrust bearing 24. The reduction gear 17 is rotatably mounted on the output shaft 15 through a pair of needle bearings 17a, and a boss of the reduction gear 17 is supported in the transmission case 3 through a bearing 25. The central differential 50 is disposed between the output shaft 15, reduction gear 17 and rear drive shaft 20.

Figure 2B:
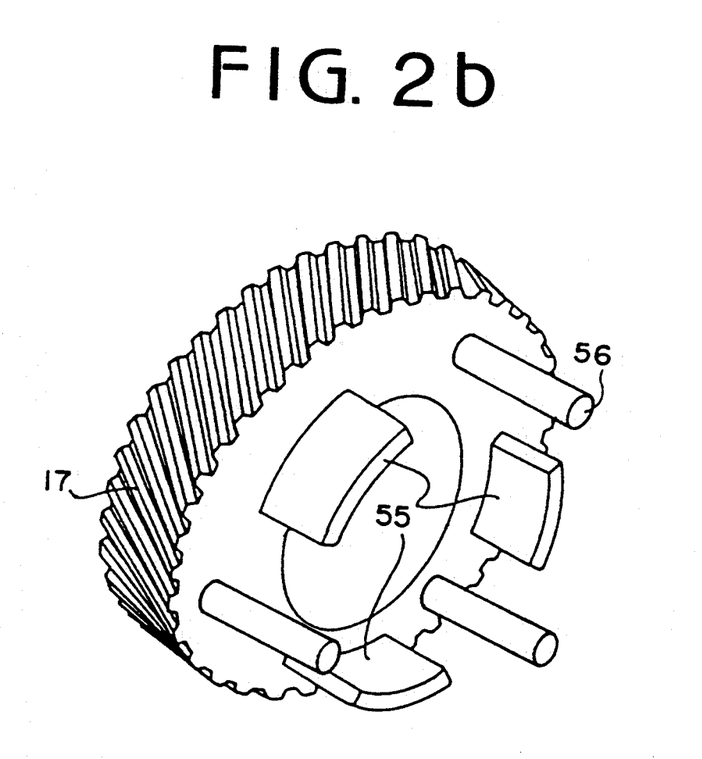
FIG. 2b is a perspective view showing a carrier provided in the central differential.

The central differential 50 is a complex planetary gear device and comprises a first sun gear 51 integrally formed on the output shaft 15, a first planetary pinion 52 meshed with the first sun gear 51, a second sun gear 53 integrally formed on the rear drive shaft 20, a second planetary pinion 54 meshed with the second sun gear 53, a carrier 57. The carrier 57 is rotatably mounted on the drive shaft 20 through a bearing 25a and connected to the reduction gear 17 by carrier connecting members 55 projecting from the gear 17. The first and second planetary pinions 52 and 54 are coupled with each other and supported on a shaft 56 through needle bearings 23b. The shaft 56 is secured to the gear 17 and the carrier 57.

Thus, the output torque from the output shaft 15 of the transmission 30 is transmitted to the carrier 57 and the second sun gear 53 through the first sun gear 51 and pinions 52, 54 at predetermined respective torque distribution ratios. The difference between rotating speeds of the carrier 57 and the second sun gear 53 is absorbed by the rotation and revolution of the first and second planetary pinions 52 and 54.

Figure 3:
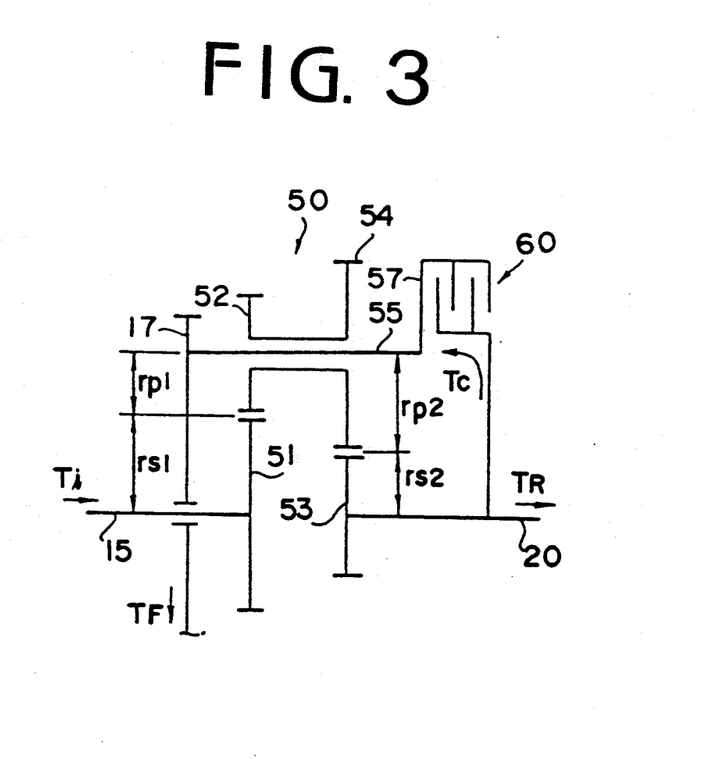
FIG. 3 is a schematic view showing the central differential.

The operation of the central differential 50 for distributing the torque to the front wheels and the rear wheels will be described hereinafter with reference to FIG. 3.

Input torque Ti of the first sun gear 51 and the relationship between the sun gears and the pinions are expressed as follows, respectively.

$$Ti = T_F + T_R \quad (1)$$

$$rs_1 + rp_1 = rs_2 + rp_2 \quad (2)$$

where $T_F$ is the front torque transmitted from the carrier 57 to the front drive shaft 16, $T_R$ is the rear torque transmitted from the second sun gear 53 to rear drive shaft 20, $rs_1$ is the radius of the pitch circle of the first sun gear 51, $rp_1$ and $rp_2$ are radii of pitch circles of the first and second pinions 52 and 54, respectively, and $rs_2$ is the radius of the pitch circle of the second sun gear 53.

A tangential load P on the engaging point of the first sun gear 51 and the first pinion 52 is equal to the sum of a tangential load $P_1$ on the carrier 57 and a tangential load $P_2$ on the engaging point of the second sun gear 53 and the second pinion 54. That is, $$\begin{aligned} P &= Ti/rs_1 \\ P_1 &= T_F/(rs_1 + rp_1) \\ P_2 &= T_R/rs_2 \\ Ti/rs_1 &= \{(T_F/(rs_1 + rp_1)\} + T_R/rs_2 \end{aligned} \quad (3)$$

Substituting equations (1) and (2) for the equation (3), $$T_F = (1 - rp_1 \cdot rs_2 / rs_1 \cdot rp_2) \cdot Ti$$

$$T_R = (RP_1 \cdot rs_2 / rs_1 \cdot rp_2) \cdot Ti$$

Consequently, it will be seen that the standard torque distribution for the front torque $T_F$ and the rear torque $T_R$ can be set to various values by changing the radii of the pitch circles of the sun gears 51 and 53 and the pinions 52 and 54.

If $rs_1$ is 23.5 mm, $rp_1$ is 16.5 mm, $rp_2$ is 18.8 mm and $rs_2$ is 21.2 mm, the front torque $T_F$ and the rear torque $T_R$ are calculated as $$TF_F = 20/53 \cdot Ti$$

$$T_R = 33/53 \cdot Ti$$

Thus, the torque distribution ratio of the front wheels and the rear wheels is $$T_F : T_R = 38 : 62$$

A large standard torque can be distributed to the rear wheels.

The clutch 60 comprises a drive drum 61 secured to the carrier 57, a driven drum 62 secured to the rear drive shaft 20, a plurality of disks 67 splined on the drum 61, and a plurality of disks 67a splined on the drum 62, alternately arranged. A retainer 67b is abutted at an innermost disk 67a. A piston 64 is slidably mounted in the transfer case 4. A pressure plate 66 is connected to the piston 64 through a bearing 65 and engaged with a retainer 67c of the drum 61. An oil chamber 63 is formed between the piston 64 and the transfer case 4. Thus, the clutch 60 is provided between the carrier 57 and the second sun gear 53 so as to change the torque distribution ratio and to lock the central differential.

When oil is supplied to the chamber 63 the piston 64 is pushed by the pressure of the oil. The pressure plate 66 pushes the disks 67 and 67a to engage the clutch 60 for producing a clutch torque.

A front-wheel speed sensor 91 is mounted on the transmission case 3 such that a pickup 91b of the sensor 91 is disposed adjacent to a parking gear 91a secured to the reduction gear 18 for detecting front-wheel speed $N_F$. A rear-wheel speed sensor 92 is mounted on the transfer case 4 so as to dispose a pickup 92b adjacent to a pulse gear 92a secured to the rear drive shaft 20 for detecting a rear-wheel speed $N_R$.

Figure 4:
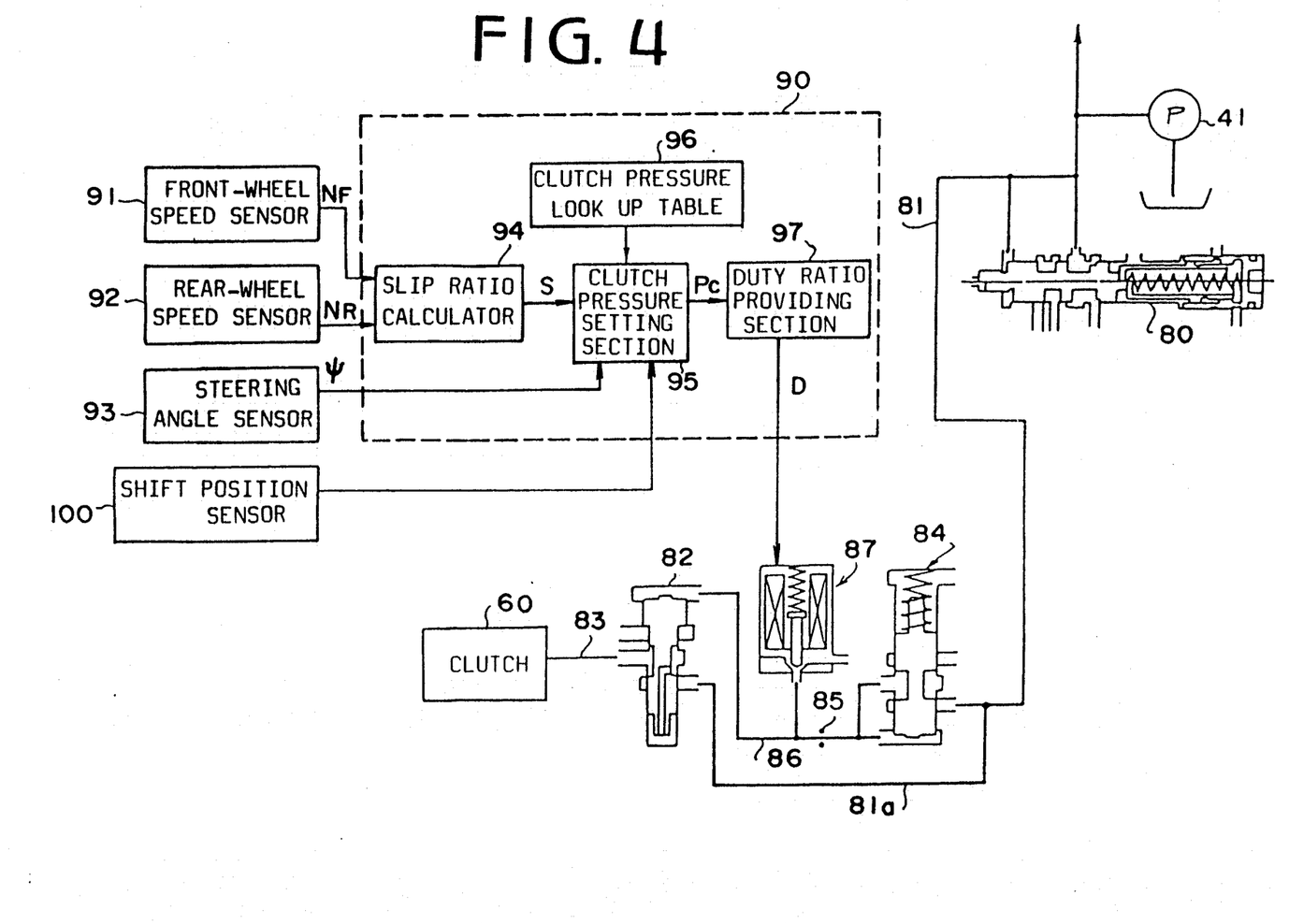
FIG. 4 is a circuit showing a control system for a hydraulic clutch provided in the central differential.

Referring to FIG. 4 showing a control system for the clutch 60, a hydraulic circuit of the control system comprises a pressure regulator valve 80, a pilot valve 84, a clutch control valve 82 and a solenoid operated duty control valve 87. The regulator valve 80 operates to regulate the pressure of oil supplied from the oil pump 41 driven by the engine to produce a line pressure and the line pressure is applied to a line pressure conduit 81 for controlling the transmission. The conduit 81 is communicated with a passage 86 through the pilot valve 84. The passage 86 is communicated with the solenoid valve 87 downstream of an orifice 85, and with an end of the clutch control valve 82. The conduit 81 is communicated with the clutch control valve 82 through a passage 81a. The clutch control valve 82 is communicated with the clutch 60 through a passage 83. The solenoid valve 87 is operated by pulses from a control unit 90 at a duty ratio determined therein so as to provide control to drain the oil for providing a control pressure. The control pressure is applied to an end of a spool of the clutch control valve 82 to control the oil supplied to the clutch 60 so as to control the clutch pressure (torque).

The control unit 90 is supplied with an output signal from the front-wheel speed sensor 91, the rear-wheel speed sensor 92, a steering angle sensor 93 and a shift position sensor 100 for detecting a shift position of the automatic transmission 30.

The control unit 90 has a slip ratio calculator 94 to which the front-wheel and rear-wheel speeds $N_F$ and $N_R$ are applied. Since the standard torque distribution is determined in accordance with the principle of $T_F < T_R$, the rear wheels slip first. A slip ratio S is calculated in accordance with the ratio of the front-wheel speed $N_F$ to the rear-wheel speed $N_R$, $S = N_F/N_R (S > 0)$. The slip ratio S, a steering angle $\psi$, and a shift position signal from the sensors 93 and 100 are applied to a clutch pressure setting section 95. In accordance with input signals, the clutch pressure setting section 95 retrieves a clutch pressure Pc from a clutch pressure look up table 96.

Figure 5:
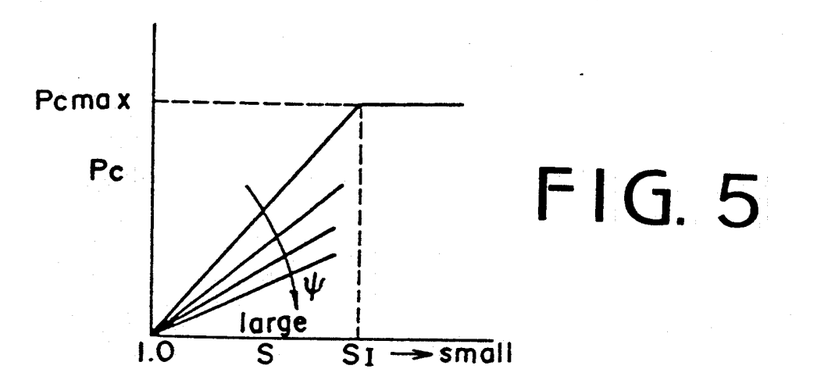
FIG. 5 is a graph showing a clutch pressure look-up table.

FIG. 5 shows clutch pressures stored in the look up table 96. When the slip ratio S is $S > 1$, which means that the rear wheels do not slip, the clutch pressure Pc is set to a small value. When the rear wheels slip and the slip ratio S becomes $S < 1$, the clutch pressure Pc (clutch torque) increases with a decrease of the slip ratio S.

When the slip ratio S becomes smaller than a set values SI, the clutch pressure Pc is set to a maximum value Pcmax. Further, when the steering angle $\psi$ increases, the clutch pressure Pc is decreased, thereby preventing the tight corner braking phenomena.

The clutch pressure Pc is applied to duty ratio providing section 97 where a duty ratio D corresponding to the derived clutch pressure Pc is provided. A duty ratio D provided at the section 97 is applied to the solenoid operated duty control valve 87.

Figure 7:
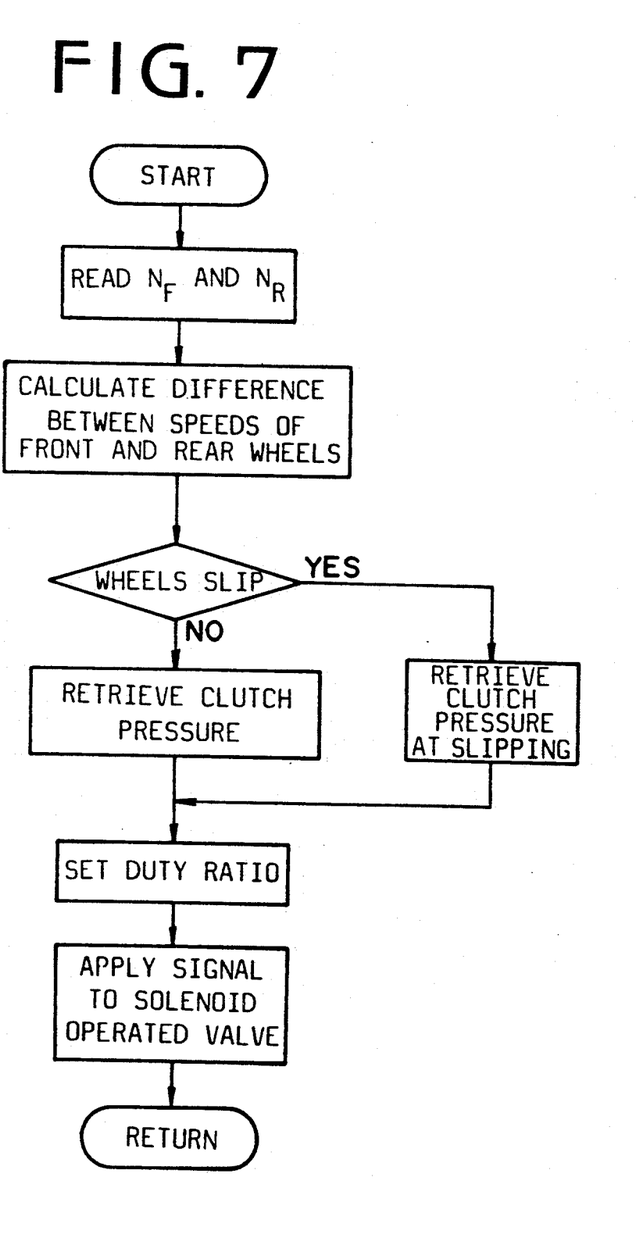
FIG. 7 is a flowchart showing the operation of a control unit in the control system.

FIG. 7 is a flowchart showing the operation of the control unit 90.

As aforementioned, the front-wheel speed $N_F$ and the rear-wheel speed $N_R$ are detected and slipping of front wheels and rear wheels is calculated. If the slip ratio is smaller than the set value, a differential operation restricting clutch torque (pressure Pcmax) is derived from the look up table 96 in accordance with the throttle opening degree, the vehicle speed, the shift position and the steering angle. The duty ratio corresponding to the derived clutch torque is applied to the solenoid operated valve 87. When the slip ratio is larger than the set value, a clutch torque is derived from the look up table 96 for operating the valve 87 at slipping.

Describing the operation of the system the power of the engine 10 is transmitted through the torque converter 13 and the input shaft 14 to the transmission 30 at which the transmission ratio is automatically controlled. The output of the transmission is transmitted to the first sun gear 51 of the central differential 50. The front torque $T_F$ and the rear torque $T_R$ are determined in accordance with the radii of gears of the central differential 50. The torque is transmitted to the reduction gear 17 through the carrier 57 at a ratio of 38% for example and to the second sun gear 53 at the ratio of 62%.

If a no slip state is detected in the control unit 90 while the vehicle is driven on the dry road, a signal corresponding to the duty ratio of 100% is applied from the duty ratio providing section 97 to the solenoid operated duty control valve 87. Thus, the clutch control pressure becomes zero and the clutch control valve 82 operates to close the passage 81a, thereby draining the oil from the clutch 60. The clutch 60 is disengaged and the clutch torque becomes zero so as to render the central differential 50 free.

Accordingly, the torque of the reduction gear 17 is transmitted to the front wheels through the reduction gear 18, the front drive shaft 16 and the front differential 19 at the ratio of 38%. Therefore the 62% torque at distribution ratio is transmitted to rear wheels through the second sun gear 53, the rear drive shaft 20, the propeller shaft 21 and the rear differential 22. This, a full-time four-wheel driving is established.

At the standard torque distribution ratio, the vehicle is driven under the understeer condition, so that good operability is ensured. Further, the vehicle smoothly negotiates a sharp corner due to the differential operation of the central differential 50.

Figure 6A:
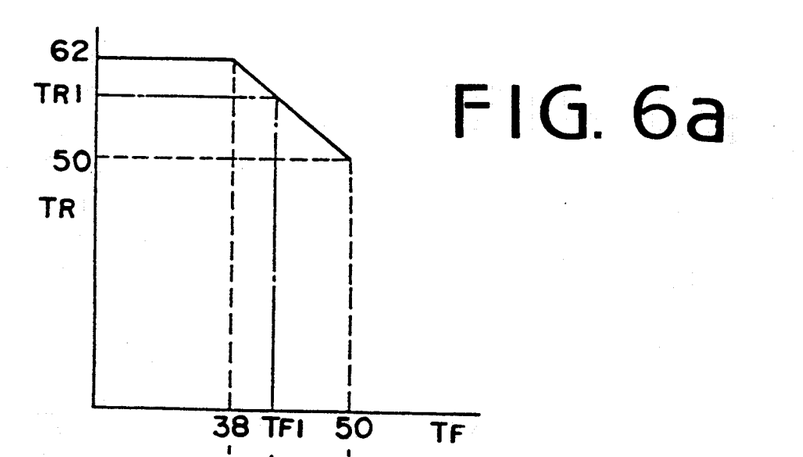
FIG. 6a is a graph showing a relationship between front torque and rear torque.

If the vehicle is driven on a slippery road, the rear wheels slip first because the larger amount of torque is distributed to the rear wheels. The slip ratio S1 is calculated at the slip ratio calculator 94 of the control unit 90. A duty signal corresponding to clutch pressure $Pc_1$ in accordance with the slip ratio $S_1$ ($S < 1$) is applied to the solenoid operated valve 87. The clutch control valve 82 is operated by the control pressure of oil obtained by regulating the line pressure at the solenoid operated valve 87, so that the clutch 60 is engaged at the clutch pressure Pc₁. Consequently, a clutch torque Tc is produced in the clutch 60. The clutch 60 is provided in parallel with the carrier 57 and the second sun gear 53 of the central differential 50. Accordingly, the clutch torque Tc is transmitted from the second sun gear 53 to the carrier 57 to increase the torque to the front wheels. Thus, the distribution ratio of the front torque and the rear torque $T_F:T_R$ becomes $T_{F1}:T_{R1}$, respectively, as shown in FIG. 6a. To the contrary, the torque to the rear wheels is reduced to eliminate slipping, thereby improving driveability to ensure good operability and safe driving.

Figure 6B:
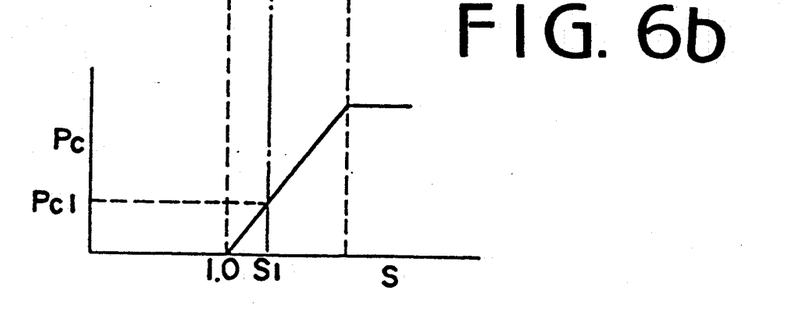
FIG. 6b is a graph showing a characteristic of a clutch pressure in accordance with a slip ratio.

When the slip ratio S becomes smaller than the set value SI, the differential operation restricting torque becomes maximum by the pressure of oil in the clutch 60. Thus, the carrier 57 is directly engaged the second sun gear 53 to lock the central differential. Thus, the four-wheel driving is established in with the torque distribution corresponding to the axle loads of the front and the rear wheels. Thus, the torque distribution is continuously controlled in accordance with the slipping condition for preventing the wheels from slipping.

When the vehicle makes a turn, the clutch torque of the clutch 60 is decreased in accordance with the steering angle $\psi$, so that the differential limit operation of the central differential 50 is decreased to sufficiently absorb the rotating difference in speeds of the front and rear wheels, thereby preventing the tight corner braking and ensuring good operability.

Figure 8A:
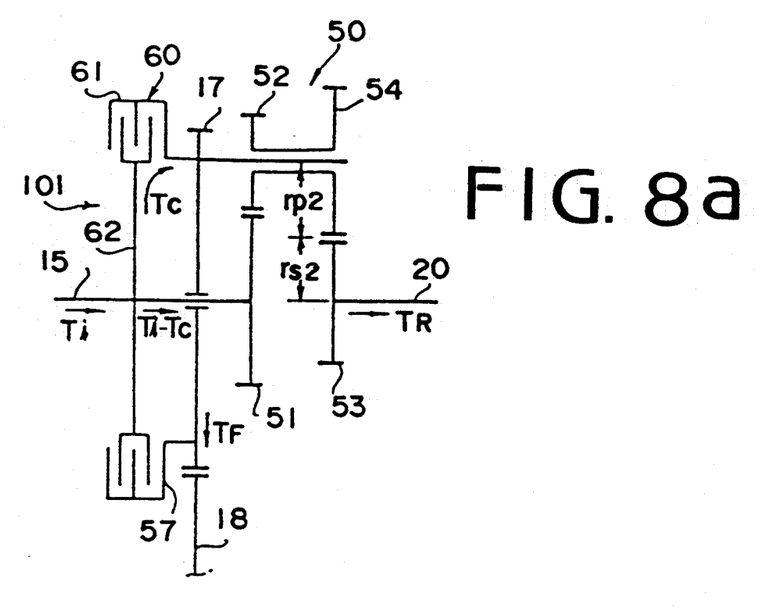
FIGS. 8a and 8b are schematic views showing other examples of the central differential.

FIG. 8a shows another example of the central differential. The fluid operated multiple-disk clutch 60 is disposed between the reduction gear 17 and the output shaft 15 of the transmission. Thus, a bypass system 101 comprising the clutch 60 is provided for the transmitting system from the output shaft 15 to the front drive shaft 16 and to the rear drive shaft 20 through the central differential 50. When the rear wheels slip the speed difference in the central differential becomes as follows:

rear-wheel speed $N_R$ > speed of output shaft 15 > front-wheel speed $N_F$.

A part of the output torque of the shaft 15 is directly transmitted to the reduction gear in accordance with the clutch torque Tc. The remaining torque is transmitted to the rear drive shaft 20 from the first sun gear 51 through the first and second pinions 52 and 54 and the second sun gear 53. The front-wheel torque $T_F$ and the rear-wheel torque $T_R$ are as follows.

$T_F = 0.38 (Ti - Tc) + Tc$ $T_R = 0.62 (Ti - Tc)$

Since the clutch torque Tc is zero in the no slip state, the torque distribution ratio of the front and the rear wheels is $T_F:T_R = 38:62$. When the rear wheels slip to produce clutch torque Tc, the input torque Ti to the clutch torque Tc is directly transmitted to the front wheels. The input torque Ti transmitted to the front wheels becomes large in accordance with the clutch torque Tc.

Figure 8B:
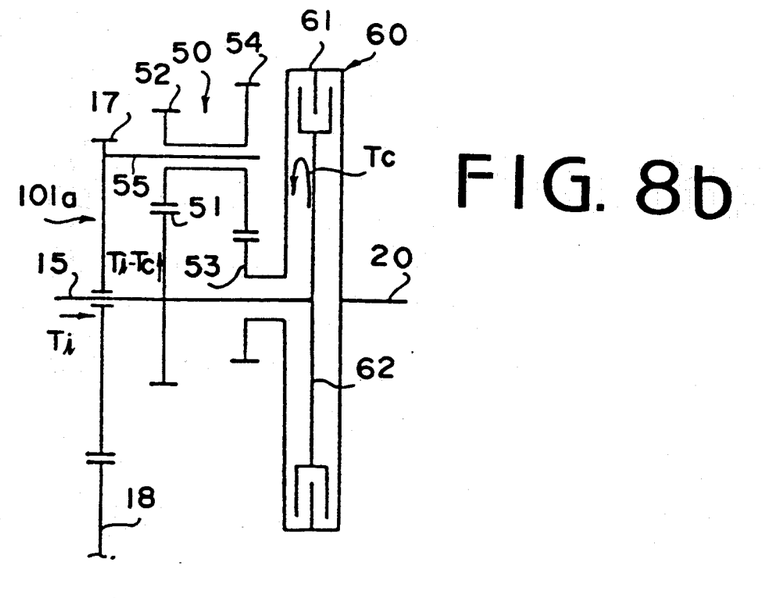

In the central differential of FIG. 8b the output shaft 15 extends through the second sun gear 53. The multiple-disk clutch 60 is disposed between the second sun gear 53 and the output shaft 15. Thus, a bypass system 101a comprising the second sun gear 53, the second pinion 54, the carrier connecting members 55, and the reduction gear 17 is provided for the output shaft 15.

The front-wheel torque $T_F$ and the rear-wheel torque $T_R$ are as follows $T_F = 0.38 (Ti + Tc)$ $T_R = 0.62 (Ti + Tc) - Tc$ When the rear wheels slip, the torque corresponding to the sum of the clutch torque Tc and the input torque Ti is transmitted to the front wheels.

The system of the present invention can be employed in a four-wheel drive motor vehicle of other types such as the type of the rear drive with a front engine. The reduction gear 17 may be replaced with sprocket wheels and chains.

In accordance with the present invention, the central differential comprises two pairs of the sun gears and the planetary pinions and the carrier. The standard torque distribution to the front wheels and the rear wheels is determined by the radii of the pitch circles of the gears and the pinions. Thus, the standard torque distribution ratio can be set to various values.

Accordingly, the system may be made to distribute larger torque to the rear wheels than that to the front wheels, without changing the size of the system. Since large torque is transmitted to the rear wheels, a wide range of controlling the torque distribution can be performed. Thus, operability and driveability of the vehicle are accurately and properly attained, thereby improving efficiencies thereof.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A system for controlling torque distribution to front wheels and rear wheels of a motor vehicle, having a transmission with an output shaft, a front wheel speed sensor for detecting front wheel speed and for producing a front wheel speed signal, and a rear wheel speed sensor for detecting rear wheel speed and for generating a rear wheel speed signal, a steering angle sensor for detecting steering angle of a front wheel and for outputting a steering angle signal, and a shift position sensor for detecting a shift position of said transmission, the system comprising:

a planetary gear device including a first sun gear connected to said output shaft of said transmission, a carrier, first and second planetary pinions coupled with each other and rotatably supported on said carrier, and a second sun gear;

said first planetary pinion being engaged with said first sun gear, and the second planetary pinion being engaged with said second sun gear;

a front torque transmission member operatively connected to said carrier and to said front wheels;

a rear torque transmitting member operatively connected to said second sun gear;

a fluid operated multiple-disk clutch disposed between said second sun gear and another member of said control means responsive to said front and rear wheel speed signals and said steering angle signal for calculating a slip ratio between said front and rear wheel speed signals and for accurately controlling clutch torque of said multiple-disk clutch in dependency on said slip ratio in a wide range so as to decrease torque distribution to the rear wheels with respect to the front wheels in accordance with an increasing function of rear wheel slippage and with decreasing steering angle, the planetary gear device absorbing speed difference between the front and rear wheels as the steering angle increases, thereby preventing tight corner braking and ensuring good operability.

* * * * *